(12) United States Patent
Kellner et al.

(10) Patent No.: US 11,872,897 B2
(45) Date of Patent: Jan. 16, 2024

(54) BATTERY DEGASSING DUCT STRUCTURE

(71) Applicant: Dr. Ing. h.c. F. Porsche Aktiengesellschaft, Stuttgart (DE)

(72) Inventors: Philipp Kellner, Renningen (DE); Sascha Mostofi, Zeltingen (DE); Christopher Volkmer, Niefern-Öschelbronn (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 72 days.

(21) Appl. No.: 17/522,020

(22) Filed: Nov. 9, 2021

(65) Prior Publication Data
US 2022/0144098 A1 May 12, 2022

(30) Foreign Application Priority Data
Nov. 10, 2020 (DE) ...................... 10 2020 129 527.8

(51) Int. Cl.
| | | |
|---|---|---|
| *B60K 1/04* | (2019.01) | |
| *B60L 3/00* | (2019.01) | |
| *B60L 50/60* | (2019.01) | |
| *H01M 50/375* | (2021.01) | |
| *H01M 50/249* | (2021.01) | |

(Continued)

(52) U.S. Cl.
CPC ............ *B60L 3/0046* (2013.01); *B60L 50/66* (2019.02); *H01M 50/204* (2021.01); *H01M 50/249* (2021.01); *H01M 50/3425* (2021.01); *H01M 50/375* (2021.01); *H01M 2220/20* (2013.01)

(58) Field of Classification Search
CPC ........... H01M 2220/20; H01M 50/375; H01M 50/249; H01M 50/204; B60L 50/66; B60L 3/0046
See application file for complete search history.

(56) References Cited

U.S. PATENT DOCUMENTS

| | | | |
|---|---|---|---|
| 8,100,211 B2 | 1/2012 | Hoh et al. | |
| 8,993,142 B2 * | 3/2015 | Sakai | ..................... B60L 1/003 180/68.5 |

(Continued)

FOREIGN PATENT DOCUMENTS

| | | |
|---|---|---|
| CN | 201336341 Y | 10/2009 |
| DE | 102008013188 A1 | 9/2009 |

(Continued)

OTHER PUBLICATIONS

Great Britain Examination Report for Application No. GB2116136. 9, dated Dec. 1, 2022, 1 page.

(Continued)

*Primary Examiner* — Jason D Shanske
*Assistant Examiner* — James J Triggs
(74) *Attorney, Agent, or Firm* — RatnerPrestia

(57) ABSTRACT

An electric vehicle has longitudinal sills, arranged on both sides of the electric vehicle, and a traction battery, arranged between the sills, for driving the electric vehicle. The traction battery has a device for degassing the traction battery in the case of a thermal event. A duct for carrying gas during degassing of the traction battery is formed in the electric vehicle between at least one of the longitudinal sills and the traction battery. An electric vehicle of this kind ensures increased occupant protection and increased component protection.

14 Claims, 1 Drawing Sheet

(51) Int. Cl.
H01M 50/342 (2021.01)
H01M 50/204 (2021.01)

(56) References Cited

U.S. PATENT DOCUMENTS

| | | | |
|---|---|---|---|
| 10,236,534 B2 | 3/2019 | Wolter et al. | |
| 2010/0285347 A1* | 11/2010 | Saito | H01M 50/264 |
| | | | 429/120 |
| 2011/0183177 A1* | 7/2011 | Sohn | H01M 50/24 |
| | | | 429/120 |
| 2014/0127539 A1 | 5/2014 | Helber | |
| 2021/0028424 A1* | 1/2021 | Schuessler | H01M 50/3425 |

FOREIGN PATENT DOCUMENTS

| | | |
|---|---|---|
| DE | 102019116969 A1 | 12/2020 |
| DE | 102020001540 A1 | 9/2021 |
| WO | 2015185723 A1 | 12/2015 |
| WO | 2021180469 A1 | 9/2021 |

OTHER PUBLICATIONS

Great Britain Combined Search and Examination Report for Application No. GB2116136.9, dated Mar. 25, 2022, 2 pages.

* cited by examiner

BATTERY DEGASSING DUCT STRUCTURE

CROSS-REFERENCE TO RELATED APPLICATION

This application claims priority to German Patent Application No. 10 2020 129 527.8, filed Nov. 10, 2020, the content of such application being incorporated by reference herein in its entirety.

FIELD OF THE INVENTION

The invention relates to an electric vehicle having longitudinal sills, arranged on both sides of the electric vehicle, and a traction battery, arranged between said sills, for driving the electric vehicle.

BACKGROUND OF THE INVENTION

In electric vehicles which are used for the electric or partially electric drive of a vehicle, the traction battery has a multiplicity of battery cells. In the case where one or more battery cells release gas, as a result of a thermal event for example, these gases have to be discharged from the traction battery in a controlled manner. The gases which are formed during this process reach high temperatures. The gases must be discharged from the system in such a way that occupants and sensitive components, such as other, intact battery cells, are not damaged.

SUMMARY OF THE INVENTION

Described herein is an electric vehicle in which high occupant protection and high component protection are ensured in the case of a thermal event of the traction battery.

The electric vehicle according to aspects of the invention has longitudinal sills, arranged on both sides of the electric vehicle, and a traction battery, arranged between said sills, for driving the electric vehicle. The traction battery has a device for degassing the traction battery in the case of a thermal event. A duct for carrying gas during degassing of the traction battery is formed in the electric vehicle between at least one of the longitudinal sills and the traction battery.

In the electric vehicle, in the case of a thermal event, the traction battery is thus degassed via the device, and this gas is fed to the duct between the longitudinal sill and the traction battery for the purpose of optimum gas conveyance during the degassing of the traction battery. This defined guidance of the gas significantly increases the protection of the components. This also applies to occupant protection.

In particular, the gases are discharged from the sealed traction battery by means of bursting elements. Bursting elements are, in particular, an opening which is provided with a diaphragm and which yields at a defined pressure and exposes the opening.

The traction battery comprises, in particular, at least one battery system, which comprises at least two battery modules. In particular, the respective battery module comprises a battery module housing and at least two battery cells.

In particular, the battery modules are individually leaktight and connected in a leaktight manner via a media channel. In particular, at least one battery cell stack is provided per battery module.

The traction battery has one or more battery cases, for example. It is possible, for example, for a plurality of battery modules to be arranged in a battery case.

It is regarded as advantageous if a bursting element is fitted in the battery case and/or the battery module housing, which bursting element serves to reduce the pressure during the sudden degassing of battery cells.

The duct for discharging the gas can be designed in various different ways. Thus, for example, the duct is formed from a surface of the traction battery facing one of the longitudinal sills and a surface of said longitudinal sill. In particular, the duct can be formed by a side wall of a battery case and one of the longitudinal sills. The duct can be formed by a plurality of individual surfaces of a plurality of battery modules and one of the longitudinal sills.

In principle, the duct can be arranged in the region of each longitudinal sill and thus between the traction battery and one longitudinal sill as well as between the traction battery and the other longitudinal sill.

From the aspect of particularly favorable degassing, it is preferably provided that surfaces associated with the traction battery and forming the duct on the battery side have one or more degassing positions. In this case, in particular, bursting elements are arranged in the region of the degassing positions. The degassing positions are thus implemented by bursting elements.

According to a preferred development, provision is made for the duct to be of open design in front of and/or behind the traction battery. According to an advantageous alternative, it is envisaged that, in front of and/or behind the traction battery, the duct has a connection to an air duct with connection to the surroundings.

The duct can be formed in part by further components. For example, a further component is a mounting bracket for the traction battery. In particular, the mounting bracket is connected to a longitudinal sill.

According to a preferred development, it is envisaged that a deflection device made of heat-resistant material for deflecting the gas flow is arranged between the longitudinal sill and the traction battery. For heat protection, the deflection device, in particular a deflection plate or a deflection sheet made of heat-resistant material, such as steel or ceramic or fiber-reinforced plastic, for deflecting the gas flow can thus additionally be arranged between the longitudinal sill and the traction battery.

BRIEF DESCRIPTION OF THE DRAWINGS

Further features of the invention will be found in the attached drawing and the description of the exemplary embodiments reproduced in the drawing, without being limited thereto. Here, in schematic illustration.

DETAILED DESCRIPTION OF THE INVENTION

Figure 1:
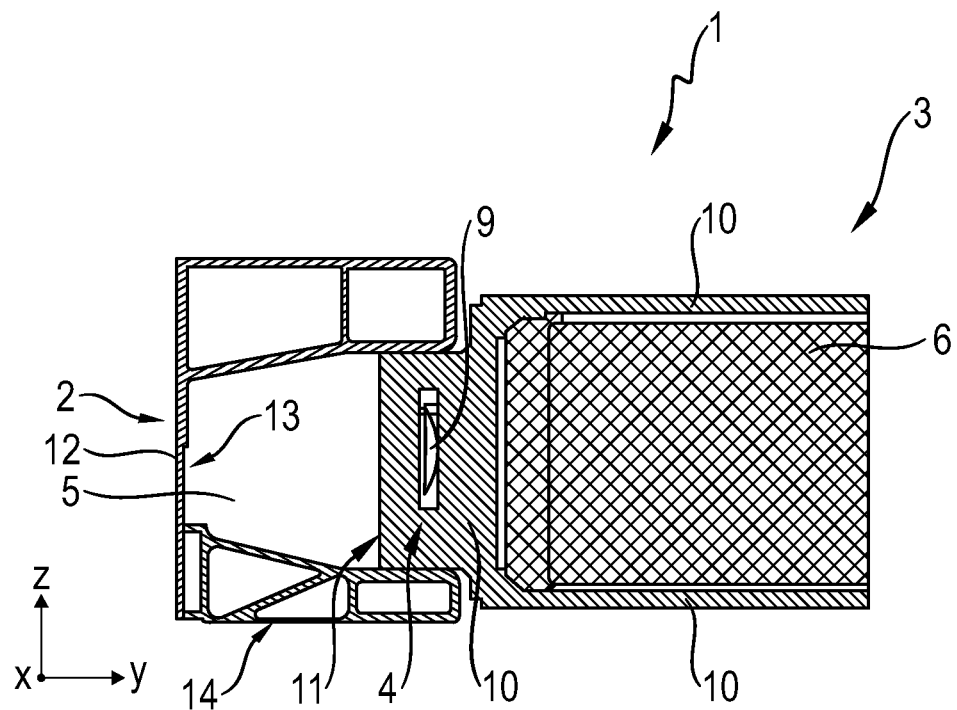
FIG. 1 shows, in a section in a Y-Z plane, an electric vehicle in a region of connection of a traction battery to a longitudinal sill of the electric vehicle.

The coordinates X—vehicle longitudinal direction, Y—vehicle transverse direction and Z—vehicle vertical direction—are illustrated.

An electric vehicle 1 has longitudinal sills 2, arranged on both sides of the electric vehicle 1, and a traction battery 3, arranged between the longitudinal sills 2, for driving the electric vehicle 1. The traction battery 3 has a device 4 for degassing the traction battery 3 in the case of a thermal event. A duct 5 for carrying gas during degassing of the traction battery 3 is formed in the electric vehicle 1 between the respective longitudinal sill 2 and the traction battery 3.

The traction battery 3 has a multiplicity of battery cells 6. The traction battery 3 comprises at least one battery system, which comprises at least two battery modules 7. The respective battery module 7 comprises a battery module housing 10 and at least two battery cells 6.

Figure 2:
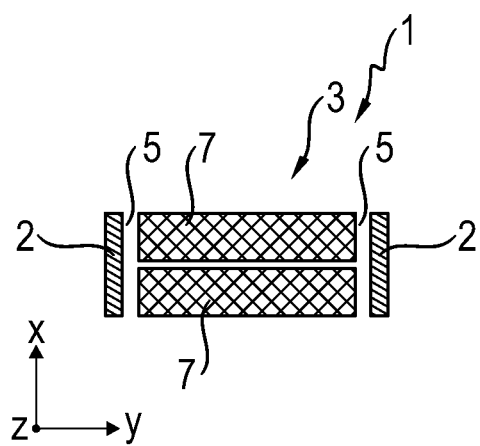
FIG. 2 shows, in a section in an X-Y plane, an embodiment of the traction battery with a plurality of battery modules and formation of ducts between the battery modules and the longitudinal sills.
Figure 3:
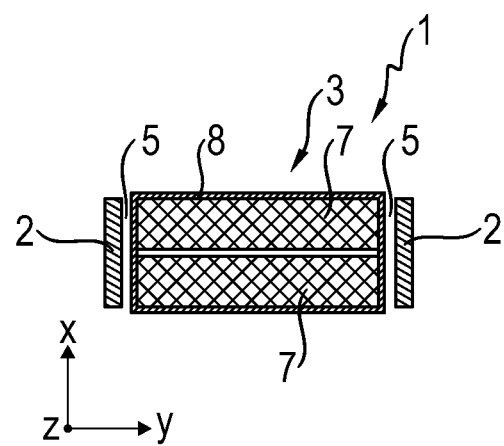
FIG. 3 shows an illustration and arrangement in accordance with FIG. 2 but when the battery modules are arranged in a battery case and the respective duct is formed between the battery case and the associated longitudinal sill.

FIG. 2 shows an exemplary embodiment of a battery system without a battery case, and therefore no battery case is assigned to the respective battery module 7. In contrast, FIG. 3 shows a slight modification in that the battery modules 7 are arranged in a battery case 8.

The device 4 for degassing the traction battery 3 has a plurality of bursting elements 9.

As can be seen, in particular, from the illustration of FIG. 1 for a preferred embodiment, a bursting element 9 is fitted in the battery module housing 10, which bursting element serves to reduce the pressure during the sudden degassing of a battery cell 6 accommodated by the battery module housing 10.

The duct 5, which is assigned to the respective longitudinal sill 2, is formed from a surface 11 of the traction battery 3, specifically the surface 11 of the battery module housing 10 facing a wall 12 of the longitudinal sill 2, and a surface 13 of said longitudinal sill 2 formed by the wall 12.

The duct 5 can be formed in part by further components. The figure illustrates a further component 14, which is a mounting bracket for the traction battery, specifically the battery module housing 10. In this case, this component 14 is connected to the longitudinal sill 2.

The exemplary embodiments according to FIGS. 2 and 3 illustrate that the duct 5 is of open design in front of and behind the traction battery 3.

What is claimed is:

1. An electric vehicle comprising:
   longitudinal sills arranged on both sides of the electric vehicle,
   a traction battery, arranged between said sills, for driving the electric vehicle, wherein the traction battery has a device for degassing the traction battery in case of a thermal event, and
   a duct for carrying gas during degassing of the traction battery, wherein the duct is located in the electric vehicle between at least one of the longitudinal sills and the traction battery, wherein the duct comprises (i) a surface of the traction battery facing one of the longitudinal sills and (ii) a surface of said one of the longitudinal sills.

2. The electric vehicle as claimed in claim 1, wherein the traction battery has a multiplicity of battery cells.

3. The electric vehicle as claimed in claim 1, wherein the traction battery comprises at least one battery system, which comprises at least two battery modules.

4. The electric vehicle as claimed in claim 3, wherein each respective battery module comprises a battery module housing and at least two battery cells.

5. The electric vehicle as claimed in claim 4, wherein the battery modules are arranged in a battery case.

6. The electric vehicle as claimed in claim 5, wherein the device for degassing is a bursting element fitted in the battery case and/or the battery module housing, which bursting element is configured to reduce a pressure during the sudden degassing of one or more of the battery cells.

7. The electric vehicle as claimed in claim 1, wherein surfaces associated with the traction battery and forming the duct on a battery side have one or more degassing positions.

8. The electric vehicle as claimed in claim 7, wherein the device for degassing comprises bursting elements arranged in a region of the degassing positions.

9. The electric vehicle as claimed in claim 1, wherein the duct is open in front of and/or behind the traction battery.

10. The electric vehicle as claimed in claim 1, wherein, in front of and/or behind the traction battery, the duct has a connection to an air duct with connection to surroundings of the electric vehicle.

11. The electric vehicle as claimed in claim 1, wherein the duct is formed in part by further components.

12. The electric vehicle as claimed in claim 11, wherein one of the further components is a mounting bracket for the traction battery, wherein the mounting bracket is connected to one of the longitudinal sills.

13. An electric vehicle comprising:
   longitudinal sills arranged on both sides of the electric vehicle,
   a traction battery, arranged between said sills, for driving the electric vehicle, wherein the traction battery has a device for degassing the traction battery in case of a thermal event, and
   a duct for carrying gas during degassing of the traction battery, wherein the duct is located in the electric vehicle between at least one of the longitudinal sills and the traction battery,
   wherein the traction battery comprises at least one battery system, which comprises at least two battery modules,
   wherein each respective battery module comprises a battery module housing and at least two battery cells,
   wherein the battery modules are arranged in a battery case,
   wherein the duct is formed by a side wall of one of the battery cases and one of the longitudinal sills.

14. An electric vehicle comprising:
   longitudinal sills arranged on both sides of the electric vehicle,
   a traction battery, arranged between said sills, for driving the electric vehicle, wherein the traction battery has a device for degassing the traction battery in case of a thermal event, and
   a duct for carrying gas during degassing of the traction battery, wherein the duct is located in the electric vehicle between at least one of the longitudinal sills and the traction battery,
   wherein the traction battery comprises at least one battery system, which comprises at least two battery modules,
   wherein the duct is formed by a plurality of individual surfaces of the battery modules and one of the longitudinal sills.

* * * * *